United States Patent [19]

Maruyama et al.

[11] Patent Number: 4,882,209
[45] Date of Patent: Nov. 21, 1989

[54] GLASS CAPILLARY TUBE AND METHOD FOR ITS PRODUCTION

[75] Inventors: Tsutomu Maruyama; Hidetoshi Matsumoto; Yoshiyuki Miyake, all of Yokohama, Japan

[73] Assignee: Asahi Glass Company, Ltd., Tokyo, Japan

[21] Appl. No.: 91,779

[22] Filed: Sep. 1, 1987

[30] Foreign Application Priority Data

Sep. 11, 1986 [JP] Japan .................. 61-212606

[51] Int. Cl.$^4$ ............................................ B32B 17/06
[52] U.S. Cl. ...................... 428/34.1; 428/34.4; 428/34.6; 428/36.3; 428/428; 65/13; 65/64; 65/108
[58] Field of Search ............ 65/13, 64, 102, 108, 65/111, 120, 292, 36, 41; 210/198.3; 428/36, 428, 448, 34.1, 34.4, 34.6, 36.3

[56] References Cited

U.S. PATENT DOCUMENTS

| | | | |
|---|---|---|---|
| 2,313,296 | 3/1943 | Lamesch et al. | 65/2 |
| 3,379,217 | 4/1968 | Leonard | 65/108 |
| 3,462,225 | 8/1969 | Couquelet | 65/108 |
| 3,486,870 | 12/1969 | Vervaart et al. | 65/36 |
| 3,652,248 | 3/1972 | Loxley et al. | 65/13 |
| 3,656,925 | 4/1972 | Dunlap | 65/36 |
| 4,078,910 | 3/1978 | Dalgoutte | 65/36 |
| 4,334,904 | 6/1982 | Apothaker et al. | 65/36 |

FOREIGN PATENT DOCUMENTS

| | | |
|---|---|---|
| 905211 | 9/1962 | United Kingdom . |
| 1113364 | 5/1968 | United Kingdom . |
| 2133786 | 8/1984 | United Kingdom . |

*Primary Examiner*—David L. Lacey
*Assistant Examiner*—L. Johnson
*Attorney, Agent, or Firm*—Oblon, Spivak, McClelland, Maier & Neustadt

[57] ABSTRACT

A method for producing a glass capillary tube, which comprises drawing under heating a multiple tube assembly comprising a plurality of glass tubes having different diameters arranged coaxially one in another and simultaneously integrating the assembly by heat fusion.

2 Claims, 1 Drawing Sheet

GLASS CAPILLARY TUBE AND METHOD FOR ITS PRODUCTION

FIELD OF THE INVENTION

The present invention relates to a glass capillary tube and a method for producing it. More particularly, the present invention relates to a glass capillary tube useful as a ferrule which is used for connecting optical fibers, and a method for its production.

DISCUSSION OF THE BACKGROUND

Heretofore, a glass capillary tube having an inner diameter of at least about 1 mm and an outer diameter of about 1 cm useful for a thermometer or for transportation of a fluid, has been produced directly from molten glass. A fine glass capillary tube having an inner diameter of from 0.1 to 0.2 mm useful as a ferrule for optical fibers in recent years, has been produced by hot stretching the glass capillary tube directly produced from molten glass as mentioned above.

However, in the method for producing the capillary tube directly from molten glass, it is extremely difficult to produce stably with high precision a capillary tube having an inner diameter of less than 0.5 mm or an outer diameter being at least about 10 times the inner diameter. In the case of producing a finer capillary tube, the capillary tube produced directly from molten glass as mentioned above is used as the starting preform, whereby it is extremely difficult to bring the inner diameter to a level of about 1/10 of the outer diameter.

SUMMARY OF THE INVENTION

It is an object of the present invention to solve these problems and to provide a glass capillary tube having desired inner and outer diameters with high precision and a method for its production.

In particular, it is an object of the present invention to provide a glass capillary tube useful as a ferrule which is used for connecting optical fibers, and a method for its production.

The present invention provides a method for producing a glass capillary tube, which comprises drawing under heating a multiple tube assembly comprising a plurality of glass tubes having different diameters arranged coaxially one in another and simultaneously integrating the assembly by heat fusion.

The present invention also provides a glass capillary tube obtained by such a method.

The coaxial arrangement of the plurality of glass tubes closely relates to the stability of the process or to the quality of the resulting glass capillary tube. Further, if the wall thickness (wall thickness=outer diameter−inner diameter) of each glass tube is not constant, it is difficult to coincide the center of the outer diameter with the center of the inner diameter of the resulting glass capillary tube. Accordingly, the coaxial arrangement of tubes and the inner diameter, outer diameter and wall thickness of each tube must be controlled with high precision.

Now, the present invention will be described in further detail with reference to the preferred embodiments.

DETAILED DESCRIPTION OF THE PREFERRED EMBODIMENTS

Figure 1:
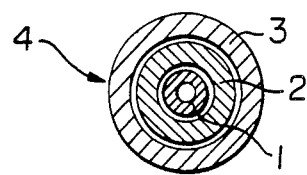
FIG. 1 is a cross sectional view of a multiple tube assembly in one embodiment of the present invention.

Now, the present invention will be described with reference to the drawings which illustrate an embodiment of the present invention. However, it should be understood that the present invention is by no means restricted to the embodiment shown in the drawings.

Figure 2:
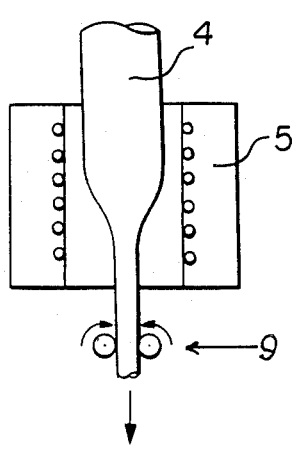
FIG. 2(a) is a diagrammatical illustration of the apparatus and method for drawing.
FIG. 2(b) is a cross sectional view illustrating an example of the glass capillary tube prepared by the drawing.
Figure 2:
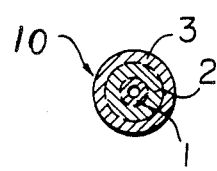

FIG. 1 is a cross sectional view of a multiple tube assembly 4 comprising a plurality of glass tubes arranged coaxially one in another. More specifically, a first glass tube 1 having an inner diameter $d_{1i}$ and an outer diameter $d_{1o}$ is placed in a second glass tube 2 having an inner diameter $d_{2i}$ and an outer diameter $d_{2o}$, which is placed in a third glass tube 3 having an inner diameter $d_{3i}$ and an outer diameter $d_{3o}$. This assembly 4 is drawn under heating by the apparatus (an electric furnace 5 and a drawing device 9) and method as illustrated in FIG. 2(a) and thereby integrated by heat fusion to form a glass capillary tube 10 as shown by cross section in FIG. 2(b). FIG. 1 illustrates an embodiment of the method of the present invention wherein a glass capillary tube is prepared from three glass tubes having different diameters. However, a glass capillary tube can be produced in the same manner also from a multiple tube assembly comprises two or four or more glass tubes having different diameters.

The glass capillary tube of the present invention is produced by drawing under heating the above-mentioned multiple tube assembly and simultaneously integrating the assembly by heat fusion. Accordingly, when the plurality of glass tubes are made of the same glass material, a glass capillary tube having an outer and inner diameters with high precision can readily be obtained, since the process for the drawing and heat fusion is stable or can easily be controlled when the thermal properties such as the thermal expansion coefficient and softening temperature are the same.

On the other hand, it is possible to produce a glass capillary tube by using glass tubes having different thermal expansion coefficients so long as the difference in the softening temperatures is within about 50° C. and there is no substantial difference in the temperature-viscosity characteristics among the glass tubes. In such a case, it is preferred to arrange the plurality of glass tubes for a multiple tube assembly so that the outermost glass tube has a thermal expansion coefficient smaller than the thermal expansion coefficient of the inner glass tube adjacent to the outermost glass tube, since it is thereby possible to obtain a glass capillary tube having high strength with the outermost layer being subjected to a compressive stress. The difference between the thermal expansion coefficients of the outermost and adjacent inner glass tubes can be selected within a wide range so long as the above-mentioned conditions for the softening temperatures and the temperature-viscosity characteristics are satisfied. Practically, the two types of glass tubes may be selected from readily available glass tubes taking into consideration the desired strength for the capillary tube, the workability for the drawing and heat fusion of the multiple tube assembly, etc. The two types of glass tubes may be selected so that the difference in the thermal expansion coefficient is not more than $2\times10^{-6}/°C$.

It is generally easy to obtain by drawing a capillary tube with a precision higher than the glass tube assembly before drawing. For example, when a glass tube assembly with a precision of $\pm0.15$ mm is drawn 1/5 time, a glass capillary tube with a precision of $\pm0.03$ mm is obtainable. To obtain a higher precision, heat treatment, grinding or polishing may be applied to tubes to prepare a glass tube assembly with a high precision prior to the drawing. It is also effective to permit a gas such as nitrogen or air to flow through the center of the assembly i.e. through the interior of the first glass tube or to reduce the pressure in the space between the glass tubes during the drawing, in order to maintain the precision and to avoid inclusion of air bubbles and attain high quality.

Thus, by using a multiple tube assembly comprising a plurality of glass tubes having different diameters arranged coaxially one in another, it is possible to prepare a glass capillary tube having desired inner and outer diameters with high precision.

By using a multiple tube assembly comprising a glass capillary tube at the center and a plurality of surrounding glass tubes coaxially arranged to provide the desired wall thickness and workability, it is possible to produce stably with high precision a glass capillary tube having a thick wall with the outer diameter extremely large relative to the inner diameter. The glass tubes having thick walls are easy to handle, and by drawing under heating, it is possible to obtain a glass capillary tube having an extremely small inner diameter. The method of the present invention makes it possible to produce stably with high precision a thick wall glass capillary tube having an outer diameter larger by about 5 times than the inner diameter, which can hardly be accomplished by a method wherein a glass capillary tube prepared directly from molten glass is simply drawn.

Thus, the method of the present invention is suitable particularly for the production of a thick wall glass capillary tube having highly precise inner and outer diameters, such as a glass ferrule to be used for connecting optical fibers. A thick wall glass ferrule has excellent strength against impact or caulking and is easy to handle.

If a glass tube having a smaller thermal expansion coefficient than the adjacent inner glass tube is used as the outermost glass tube of the multiple tube assembly, a glass capillary tube obtained by the drawing and heat fusion for the integration of the assembly, will have still higher strength with the outer layer being subjected to compressive stress. A glass ferrule prepared in this manner will have higher strength against impact or caulking.

Now, the present invention will be described in further detail with reference to Examples. However, it should be understood that the present invention is by no means restricted to such specific Examples.

EXAMPLE 1

Three borosilicate glass tubes having a length of 70 cm and with an inner diameter of $1.0_{-0}^{+0.01}$ mm and an outer diameter of $8.0\pm0.1$ mm, an inner diameter of $8.2_{-0}^{+0.1}$ mm and an outer diameter of $13\pm0.1$ mm, and an inner diameter of $13.6\pm0.1$ mm and an outer diameter of $20\pm0.2$ mm, respectively, were arranged coaxially so that the cross section of the assembly would be as shown in FIG. 1(a), and the upper portions of the glass tubes were held by a conventional means not shown, and the three tube assembly was heated at a temperature of about 840° C. in an electric furnace and drawn so that the three tubes were integrated by fusion to form a capillary tube having an inner diameter of $0.2\pm0.01$ mm and an outer diameter of $3.9\pm0.1$ mm.

EXAMPLE 2

A core wire having a diameter of $1.0\pm0.01$ mm was inserted in a soda-lime glass tube having an inner diameter of about 1.5 mm and an outer diameter of about 9.0 mm. While vacuuming the interior of the glass tube to a reduced pressure of about $-200$ mmHg by an aspirator, the glass tube was heated at a temperature of about 680° C. from outside, whereby a glass tube having a highly precise inner diameter of $1.0_{-0.01}^{+0.02}$ was obtained by heat treatment. The core wire was readily removed after cooling because of the difference in the thermal expansion from glass. The outer surface of the glass tube was ground and polished to finish the outer diameter of the glass tube to be $8.0\pm0.05$ mm. Then, the glass tube was drawn under heating to have an outer diameter of $3.0\pm0.02$ mm. This glass tube was placed coaxially in another soda-lime glass tube having an inner diameter of $3.2_{-0.1}^{+0}$ mm and an outer diameter of $9.0\pm0.1$ mm to obtain a two tube assembly. This assembly was drawn at a temperature of about 720° C. to obtain a capillary tube having an inner diameter of 0.1 mm and an outer diameter of 2.4 mm. By maintaining the precision in each step, the capillary tube was prepared with the precision of the inner diameter of $\pm0.005$ mm and with the precision of the outer diameter of $\pm0.05$ mm.

EXAMPLE 3

Figure 3:
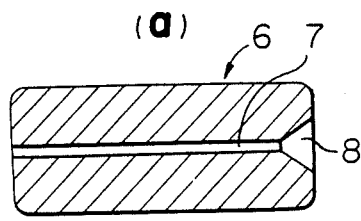
FIG. 3(b) is a view of a tapered mouth end of a glass ferrule as an embodiment of the present invention.
FIG. 3(a) is a cross sectional view taken along line AA in FIG. 3(b).
Figure 3:
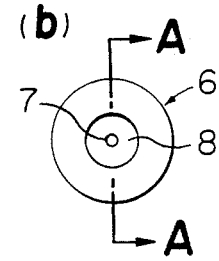

A borosilicate glass tube having an inner diameter of $0.8_{-0}^{+0.1}$ mm and an outer diameter of $7_{-0}^{+0.1}$ mm was drawn at a temperature of about 840° C. to obtain a glass tube having an inner diameter of $0.39\pm0.01$ mm and an outer diameter of $3.4_{-0}^{+0.05}$ mm. This glass tube was placed coaxially in a borosilicate glass tube having an inner diameter of $3.5_{-0}^{+0.1}$ mm and an outer diameter of $9_{-0}^{+0.1}$ mm to obtain a two tube assembly. This assembly was drawn at a temperature of about 840° C. to obtain a capillary tube having an inner diameter of $0.130\pm0.0003$ mm and an outer diameter of $3.0\pm0.03$ mm. This capillary tube was cut into a length of 0 mm, and as shown at reference numeral 8 in FIG. 3, a tapered mouth with an inlet diameter of $1.1\pm0.1$ mm and a depth of about 1 mm was provided at one end, and then both ends were polished to obtain a ferrule for optical fibers.

FIG. 3(b) shows a view of the tapered mouth 8 end of the glass ferrule 6 having a capillary 7, and FIG. 3(a) is a cross section taken along line AA in FIG. 3(b).

EXAMPLE 4

A borosilicate glass tube having an inner diameter of $1.0_{-0}^{+0.1}$ mm, an outer diameter of $8\pm0.1$ mm, a thermal expansion coefficient of $3.9\times10^{-6}/°C.$ and a softening point of 770° C., was drawn at a temperature of about 810° C. to obtain a glass tube having an outer diameter of $2.9\pm0.05$ mm. This glass tube was placed coaxially in a borosilicate glass tube having an inner diameter of $3.0_{-0}^{+0.1}$ mm, an outer diameter of $9\pm0.1$ mm, a thermal expansion coefficient of $3.25\times10^{-6}/°C$. and a softening point of 815° C. to form a two tube assembly. This assembly was drawn at a temperature of about 850° C. to obtain a capillary tube having an inner diameter of $0.130\pm0.0005$ mm and an outer diameter of $3.0\pm0.05$ mm. This capillary tube had an average breaking strength higher by about twice than the capillary tube where the outer glass tube and inner glass tube are made of the same glass.

According to the present invention, it is possible to obtain a glass capillary tube having desired inner and outer diameters by a proper combination of a plurality of glass tubes having selected diameters. The glass capillary tube can be prepared with high precision by using glass tubes having the precision preliminarily improved by heat treatment or drawing. To maintain the precision and to avoid inclusion of air bubbles and obtain high quality, it is also effective to permit a gas such as nitrogen or air to flow through the center of the multiple tube assembly i.e. through the interior of the first glass tube or to reduce the pressure at the space between the glass tubes during the drawing.

Thus, according to the present invention, the range from which the glass tubes can be selected, will be widened, and at the same time, a capillary tube with high precision can be stably produced. Accordingly, it is possible to reduce the costs for glass capillaries. Further, a capillary tube having a large outer diameter relative the inner diameter (the ratio of the outer diameter to the inner diameter being 8 or more) is useful particularly for parts of fluid transportation system or for optical parts such as ferrules, since it simplifies the construction of the system or facilitates its handling. It has been made possible for the first time by the present invention to produce such a capillary tube stably.

In particular, the glass ferrule produced by the method of the present invention not only has highly precise inner and outer diameters but also has a large ratio of the outer diameter to the inner diameter, whereby ratio of the outer diameter to the inner diameter, whereby it is highly reliable from the viewpoint of strength. The efficiency in mounting optical fibers or in setting the connectors or alignment with a lens can thereby be improved, and it is also possible to reduce the cost for assembling.

I claim:

1. A glass capillary tube obtained by drawing under heating a multiple tube assembly comprising a plurality of glass tubes having different diameters arranged coaxially one in another and simultaneously integrating the glass tubes by heat fusion, wherein the ratio of the outer diameter to the inner diameter of the capillary tube is at least about 5, and wherein the outermost glass tube in the multiple tube assembly has a thermal expansion coefficient smaller than the thermal expansion coefficient of the inner glass tube adjacent to the outermost glass tube.

2. The glass capillary tube according to claim 1, wherein the difference between the thermal expansion coefficients of the outermost glass tube and the inner adjacent glass tube is not more than $2\times10^{-6}/°C$.

* * * * *